United States Patent
Westman

(10) Patent No.: US 8,317,130 B1
(45) Date of Patent: Nov. 27, 2012

(54) LANDING GEAR MOUNT

(75) Inventor: Aaron L. Westman, Rochester, MN (US)

(73) Assignee: Lockheed Martin Corporation, Bethesda, MD (US)

( * ) Notice: Subject to any disclaimer, the term of this patent is extended or adjusted under 35 U.S.C. 154(b) by 1126 days.

(21) Appl. No.: 12/200,318

(22) Filed: Aug. 28, 2008

(51) Int. Cl.
*B64C 25/10* (2006.01)
*B64C 25/14* (2006.01)
*B64C 25/20* (2006.01)

(52) U.S. Cl. ............ 244/102 R; 244/100 R; 244/102 A; 244/103 R; 244/104 R

(58) Field of Classification Search ............... 244/119, 244/131, 100 R, 102 R, 102 A, 102 SL, 102 SS, 244/103 R, 104 R
See application file for complete search history.

(56) References Cited

U.S. PATENT DOCUMENTS

| | | | | |
|---|---|---|---|---|
| 2,323,640 A | * | 7/1943 | Armstrong | 244/102 R |
| 2,437,574 A | * | 3/1948 | Watter et al. | 244/117 R |
| 2,777,652 A | * | 1/1957 | Grudin | 244/104 FP |
| 3,900,988 A | * | 8/1975 | Garabello | 446/55 |
| 5,482,228 A | * | 1/1996 | Hoshino | 244/50 |
| 5,863,013 A | | 1/1999 | Schmittle | |
| 5,934,616 A | * | 8/1999 | Reimers et al. | 244/119 |
| 6,626,398 B1 | | 9/2003 | Cox et al. | |
| 7,407,134 B2 | * | 8/2008 | Bietenhader | 244/102 A |
| 7,413,140 B2 | * | 8/2008 | Bietenhader | 244/17.11 |
| 7,429,019 B1 | * | 9/2008 | Bietenhader | 244/102 A |
| 7,641,146 B2 | * | 1/2010 | Wood et al. | 244/119 |
| 7,699,261 B2 | * | 4/2010 | Colten et al. | 244/45 R |
| 7,798,444 B2 | * | 9/2010 | Wood | 244/102 A |
| 2007/0057118 A1 | * | 3/2007 | Bietenhader | 244/102 R |
| 2007/0095976 A1 | * | 5/2007 | Bietenhader | 244/102 A |
| 2008/0237396 A1 | * | 10/2008 | Bietenhader | 244/102 A |
| 2009/0078822 A1 | * | 3/2009 | Wood | 244/102 R |
| 2009/0078823 A1 | * | 3/2009 | Wood et al. | 244/119 |
| 2010/0072319 A1 | * | 3/2010 | De Ruffray et al. | 244/102 SS |
| 2010/0176240 A1 | * | 7/2010 | Guering et al. | 244/102 R |
| 2010/0237189 A9 | * | 9/2010 | De Ruffray et al. | 244/102 SS |

OTHER PUBLICATIONS

Hammer et al. "Sky Spirit: Integration of UAV Design into an Aerospace Design Course." American Institute of Aeronautics and Astronautics paper 2005-6959, Sep. 2005, 4 pages.
"Sky Spitit Mini UAV." obtained from http://www.defense-update.com/products/s/sky_spirit.htm, Aug. 14, 2008, 2 pages.
Information Regarding Use of Disclosed Landing Gear Mount Prior to Application Filing Date of Aug. 28, 2008, prepared by Applicant, 2 pages.

* cited by examiner

*Primary Examiner* — Philip J Bonzell
(74) *Attorney, Agent, or Firm* — Hamre, Schumann, Mueller and Larson, P.C.

(57) ABSTRACT

Landing gear mount techniques for aircraft are described. The landing gear is mounted to composite structures of the aircraft in a manner that distributes landing loads, including out-of-plane loads, adequately so that the landing gear and its mounting to the aircraft is tough and can withstand variable landing loads. The landing gear is disposed between and fastened on each side to composite bulkheads. The composite bulkheads are also bonded to the outer skins of the aircraft. The described mounting distributes the loads into the composite bulkheads and from there into the outer skins. This distribution of the loading helps the landing gear withstand variable landing loads and helps maintain the integrity of the composite materials.

15 Claims, 6 Drawing Sheets

LANDING GEAR MOUNT

FIELD

This disclosure relates to aircraft with landing gear, in particular mounting of the landing gear to composite structure of the aircraft.

BACKGROUND

Composite materials do not typically perform well when loaded out-of-plane. This is not a problem when the loading situation is well known or constant. However, when the loading situation is highly variable, composites can perform poorly.

There is increasing use of composite materials in aircraft, including unmanned aerial vehicles (UAV's). UAV's are often provided with landing gear to facilitate landing, where the landing gear is connected to the composite material forming the UAV. When landing UAV's, they often land rough and are subject to high and variable loads. Since the landing gear is connected to the composite material, this can lead to failure, for example delamination, of the composite at or near the interface of the landing gear and the composite structure.

Thus, improvements in mounting landing gear of aircraft to composite structure of the aircraft is desirable.

SUMMARY

An improved landing gear mount for aircraft is described, where the landing gear is fixed to composite structures of the aircraft in a manner that distributes landing loads, including out-of-plane loads, adequately so that the landing gear and its mounting to the aircraft is tough and can withstand variable landing loads. The concepts described herein are applicable to any aircraft where the landing gear is to be connected to composite structures of the aircraft. One example of an aircraft that can employ the concepts described herein is a UAV which utilizes a skeleton structure formed from composite bulkheads and composite outer skins bonded to the bulkheads.

The landing gear is disposed between and fastened on each side to composite bulkheads. The composite bulkheads are also bonded to the outer skins of the aircraft. The disclosed mounting distributes the loads into the composite bulkheads and from there into the outer skins. This distribution of the loading helps the landing gear withstand variable landing loads and helps maintain the integrity of the composite materials.

In one embodiment, an aircraft landing gear mount includes first and second bulkhead panels formed of composite material, the bulkhead panels extending vertically and the bulkhead panels include facing side surfaces. Landing gear including a support rod and a wheel connected to an end of the support rod is also provided. The support rod includes a mounting end that is disposed between the facing side surfaces of the first and second bulkhead panels. The mounting end of the support rod is fastened to the facing side surfaces of the first and second bulkhead panels.

In another embodiment, an aircraft includes a plurality of bulkhead panels formed of composite material, with the bulkhead panels extending vertically and each bulkhead panel including side surfaces and a top surface. A plurality of landing gear are provided, with each landing gear including a support rod and a wheel connected to an end of the support rod. Each support rod includes a mounting end that is disposed between facing side surfaces of two of the bulkhead panels. The mounting end of each support rod is fastened to the facing side surfaces of two bulkhead panels. In addition, aircraft skins are disposed over the bulkhead panels and fastened to the top surfaces of the bulkhead panels using a bonding material.

DRAWINGS

DETAILED DESCRIPTION

Figure 1:
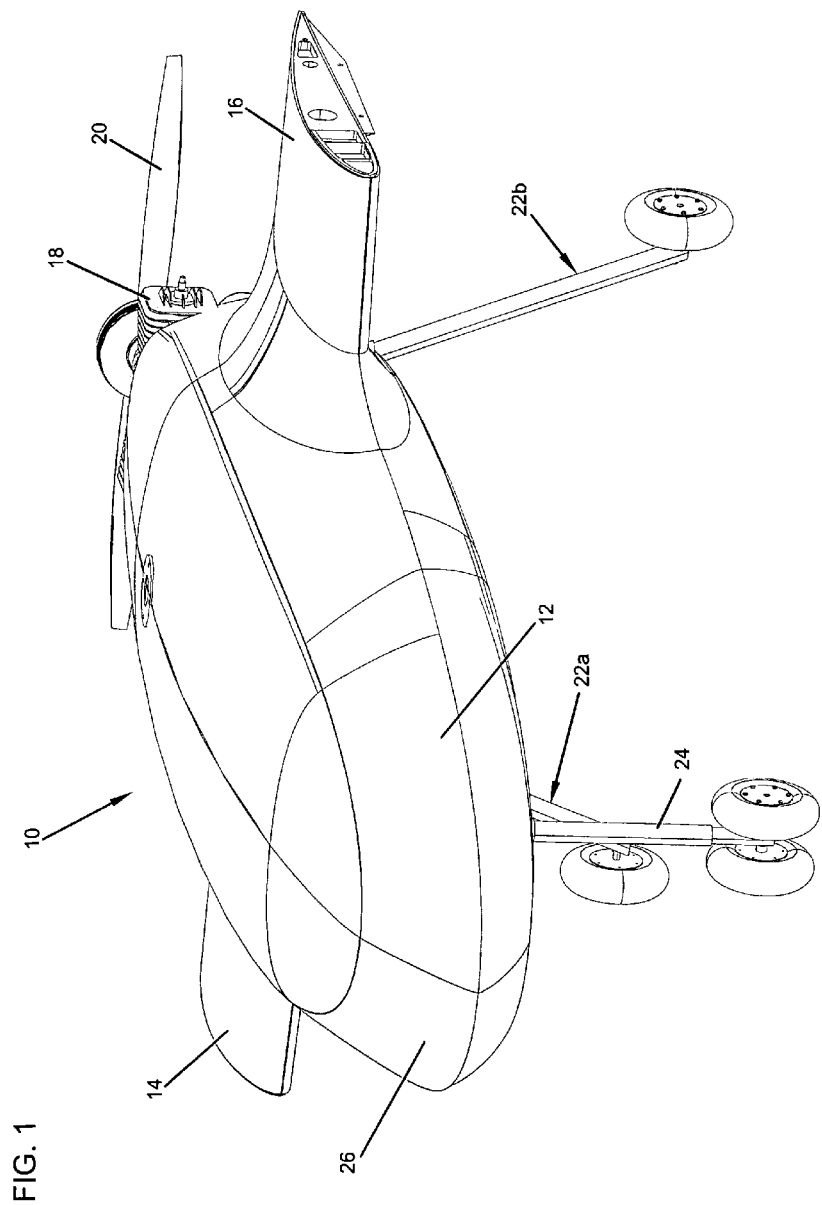
FIG. 1 is a perspective view of an aircraft that employs the inventive concepts described herein.

FIG. 1 illustrates an aircraft 10 that employs the inventive concepts described herein. The aircraft 10 is illustrated as being a UAV with an aircraft fuselage or main body 12, wings 14, 16, an engine 18 driving a propeller 20 at the rear of the fuselage, and landing gear including right and left rear landing gear 22*a*, 22*b* and front landing gear 24. However, the aircraft is not limited to a UAV, and the inventive concepts can be employed on other types of aircraft, including manned aircraft.

Figure 2:
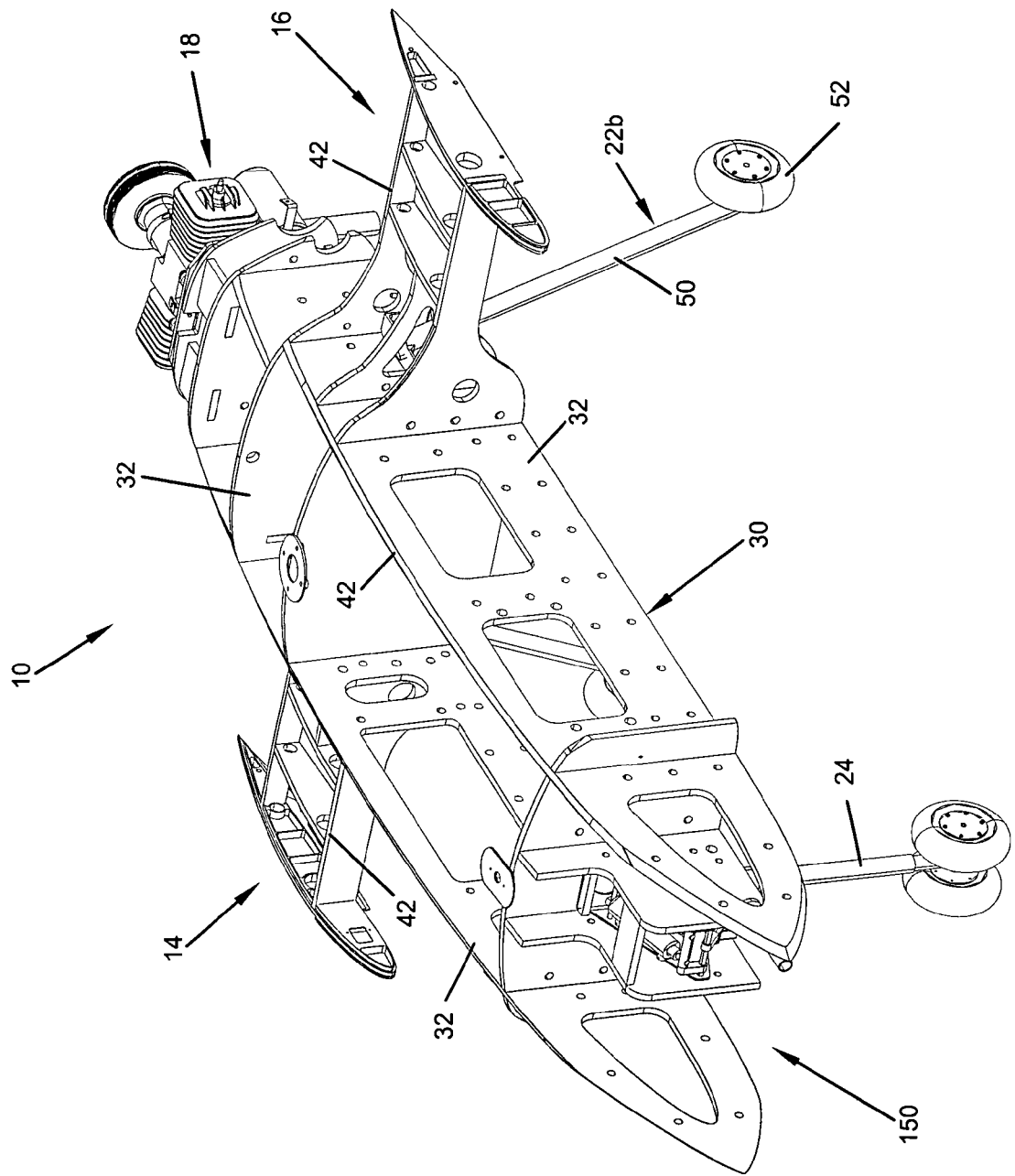
FIG. 2 depicts the aircraft of FIG. 1 with the outer skins removed to reveal the composite bulkhead panels.

Composite outer skins 26 form the exterior of the aircraft 10 to form a smooth, aerodynamic exterior surface. FIG. 2 illustrates the aircraft 10 with the skins 26 removed. The composite material forming the skins 26 can be any suitable composite material, for example a carbon fiber composite or a glass fiber composite.

The fuselage 12 and wings 14, 16 of the aircraft 10 are formed by a composite substructure 30 created by a plurality of composite bulkhead panels 32. The various panels 32 extend in the axial direction (i.e. in the front to back direction) of the aircraft and in a direction transverse to the axial direction (i.e. in the direction of the wings 14, 16). The composite panels 32 are formed of a suitable composite material to meet strength and weight requirements for the aircraft. An example of a suitable composite material is a carbon fiber composite. The panels 32 are preferably anisotropic with the fiber orientation in a single direction.

The panels 32 are bonded to each other where they adjoin using a suitable bonding material, such as an epoxy. In addition, the bulkhead panels 32 include generally planar edge surfaces 42 to which the skins 26 are bonded using a suitable bonding material, such as an epoxy.

Figure 3:
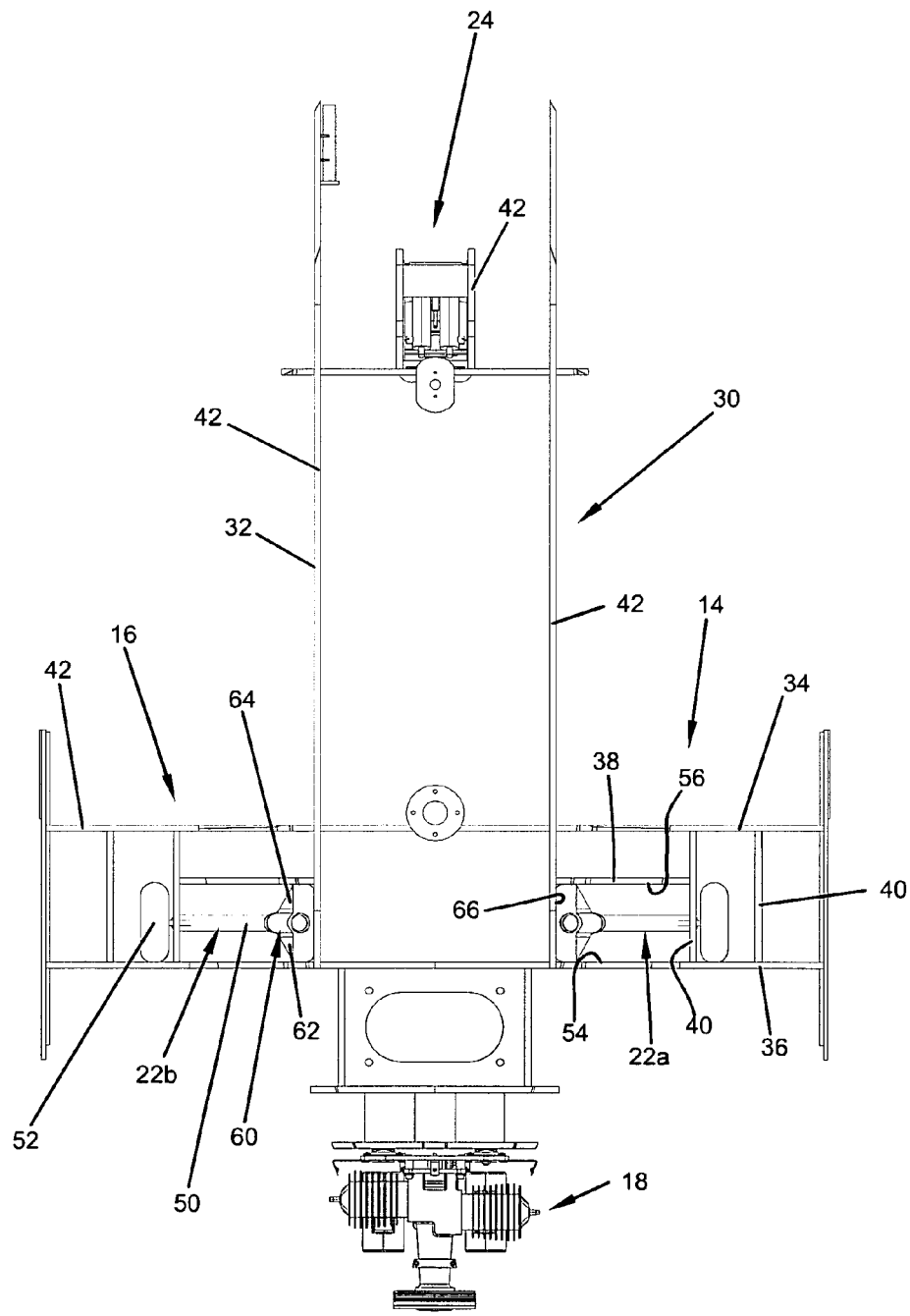
FIG. 3 is a top view of FIG. 2.
Figure 4:
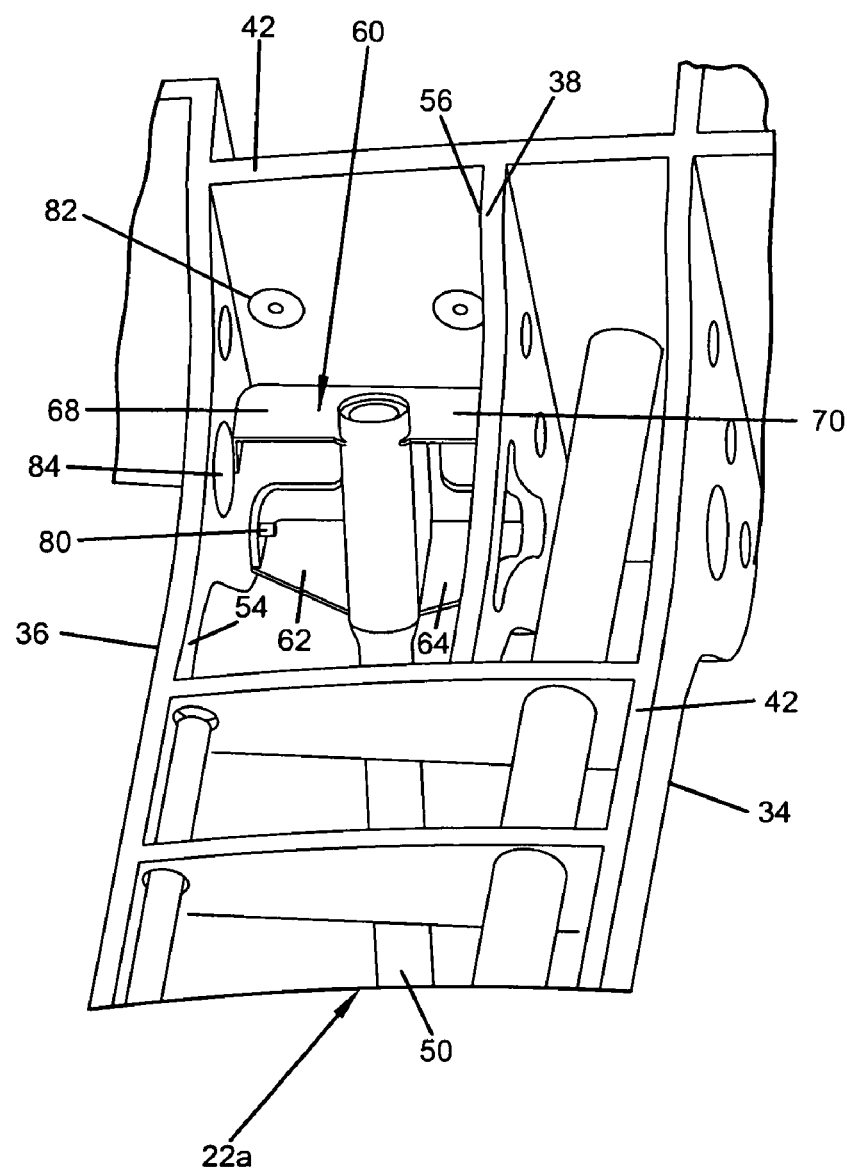
FIG. 4 is a detailed view of the right wing illustrating details of how the landing gear is mounted to the wing.

With reference to FIGS. 2-4, the bulkhead panels 32 forming each wing 14, 16 include a front wing spar 34, a rear wing spar 36, a middle wing spar 38, and axial wing ribs 40. The right and left rear landing gear 22*a*, 22*b* are mounted to the wings 14, 16 in an identical manner. Therefore only the mounting of the landing gear 22*b* will be described in detail, it being understood that the landing gear 22*a* is mounted to the wing 14 in an identical manner.

The landing gear 22*b* includes a metal support rod 50 and a wheel 52 rotatably mounted to the lower end of the support rod 50 that allows the aircraft to roll on the ground during take-offs and landings. The upper end of the support rod 50 defines a mounting end that is disposed between facing side surfaces 54, 56 of the rear wing spar 36 and the middle wing spar 38.

A metal support structure 60 (best seen in FIGS. 3 and 4), for example an aluminum bracket, is fixed to the mounting end of the rod 50. The support structure 60 includes a lower mount section that includes a first portion 62 that extends toward, and is designed to be closely adjacent to or abut, the side surface 54, and a second portion 64 that extends toward, and is designed to be closely adjacent to or abut, the side surface 56. The first and second portions 62, 64 are also closely adjacent to or abutting against the side surface 66 of the bulkhead panel 32 that extends between the spars 36, 38.

The support structure 60 also includes an upper mount section disposed vertically above and connected to the lower mount section. The upper mount section includes a first portion 68 that extends toward, and is designed to be closely adjacent to or abut, the side surface 54, and a second portion 70 that extends toward, and is designed to be closely adjacent to or abut, the side surface 56.

As best seen in FIG. 4, the first and second portions 62, 64, 68, 70 are detachably fastened to the wing spars 36, 38 using suitable detachable fastening mechanisms 80, for example bolts. The first and second portions 62, 64 of the lower mount section are also detachably fastened to the bulkhead panel 32 between the spars 36, 38 using similar fastening mechanisms 80. To facilitate connection, grommets 82, for example aluminum grommets, can be disposed within holes 84 formed in spars 36, 38 and panel 32, with the fastening mechanisms 80 then being connected to the grommets 82.

This mounting of the right and left rear landing gear 22a, 22b distributes landing loads, including out-of-plane loads, into each of the wing spars 36, 38 as well as the bulkhead panel 32 between the wing spars 36, 38. The load is then distributed into the skins 26 which are bonded to the panels 32/wing spars. Because the load is distributed in this manner, the landing gear 22a, 22b is able to withstand greater landing loads, and the composite bulkhead panels are less likely to suffer failure, such as delamination, resulting from out-of-plane loads.

The right and left rear landing gear 22a, 22b are described as being fixed (i.e. non-retractable). However, the concepts described herein could also be applied where the landing gear 22a, 22b are designed to retract.

Figure 5:
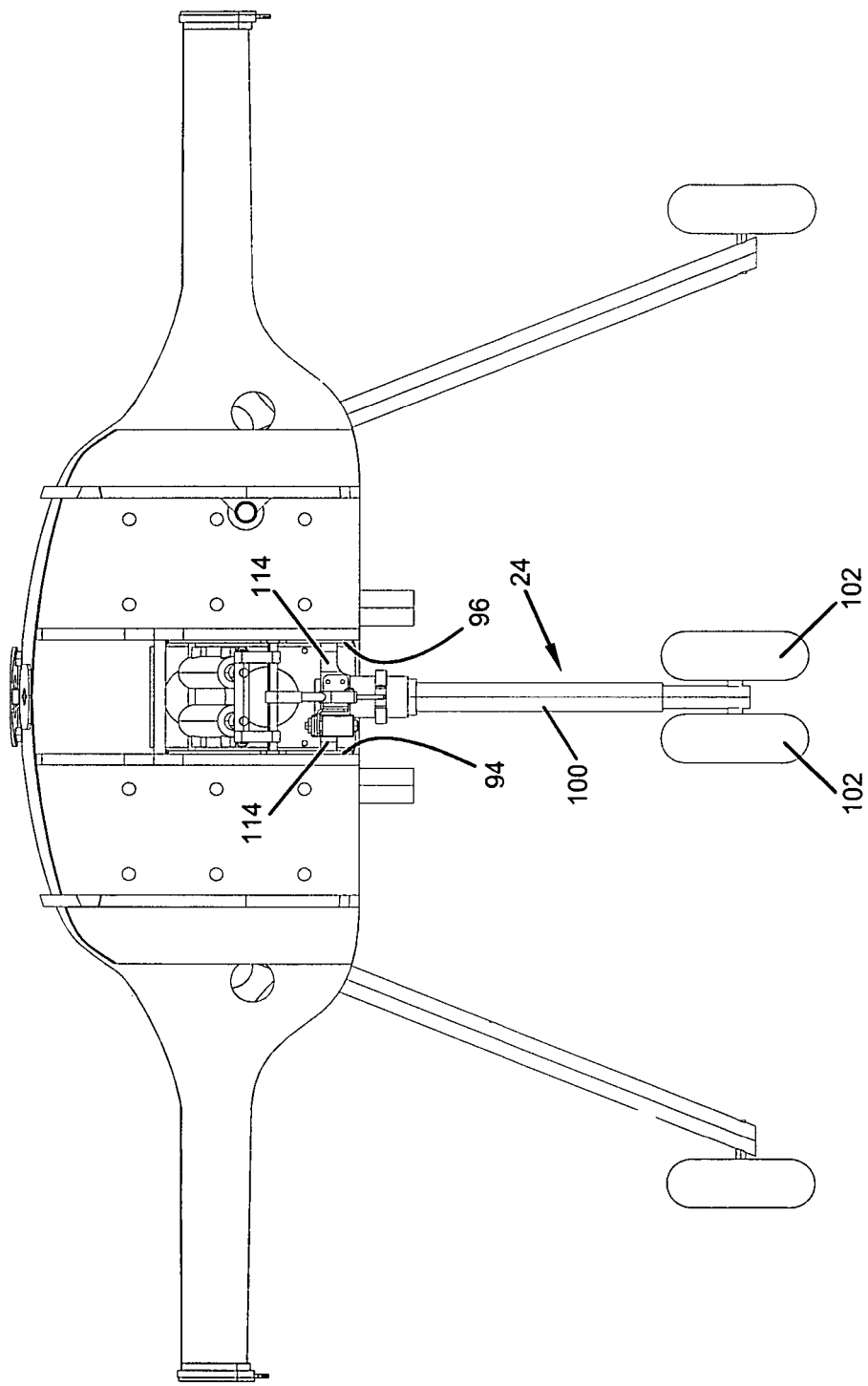
FIG. 5 is a front view of FIG. 2 showing details of the front landing gear mount.
Figure 6:
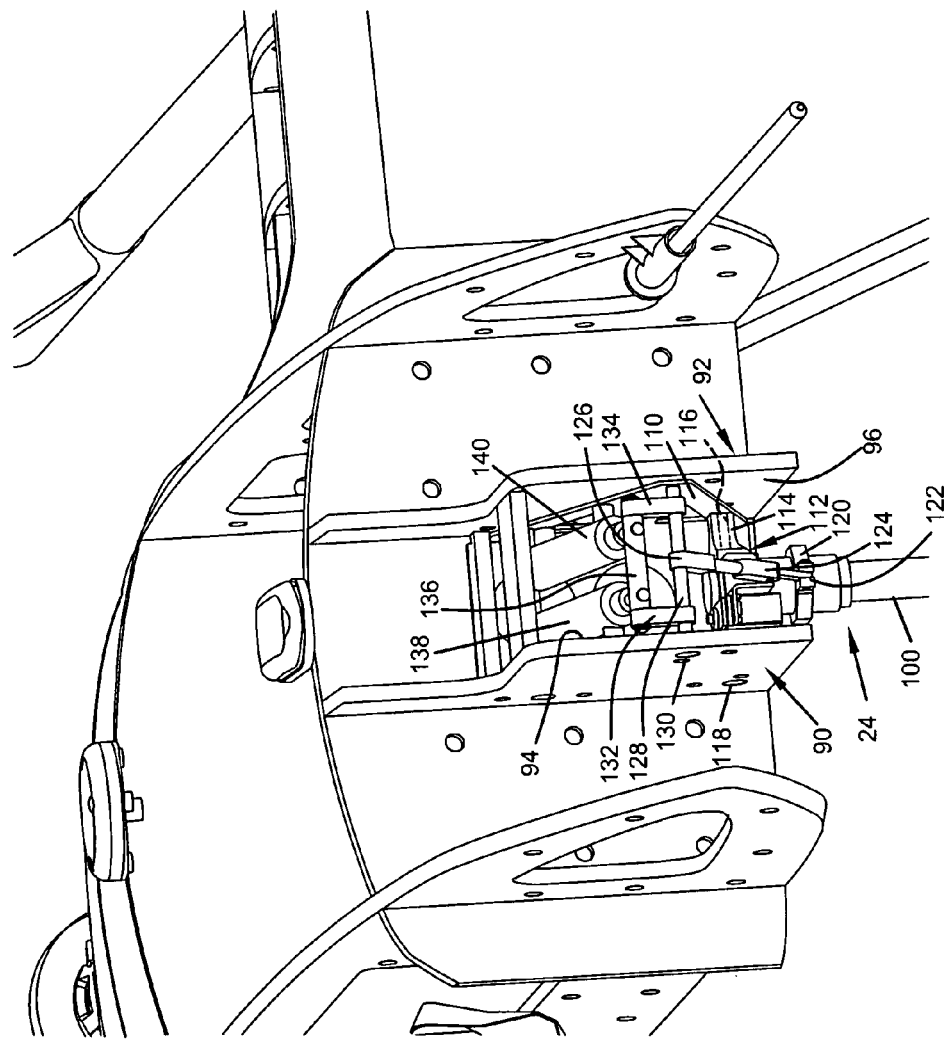
FIG. 6 is a detailed view of the front landing gear mount.

With reference now to FIGS. 5 and 6, the mounting of the front landing gear 24 will now be described. The bulkhead panels 32 include a pair of nose bulkhead panels 90, 92 having facing side surfaces 94, 96. The front landing gear 24 includes a metal support rod 100 and a pair of wheels 102 rotatably mounted to the lower end of the support rod 100 that allow the aircraft to roll on the ground during take-offs and landings. The upper end of the support rod 100 defines a mounting end that is disposed between the facing side surfaces 94, 96.

The front landing gear 24 is designed to be pivotally mounted so that it is retractable. In particular, a pair of metal support structures 110 (only one is visible in FIG. 6), for example L-shaped aluminum brackets, are fixed to the facing side surfaces 94, 96. The top end of the support rod 100 includes a collar 112 fixed thereto, with the collar including opposite flanges 114 (only one flange 114 is visible in FIG. 6) that extend toward the respective side surfaces 94, 96. The ends of the flanges 114 are positioned closely adjacent the side surfaces 94, 96. Pivot shafts 116 (shown in dashed lines in FIG. 6) extend from each flange 114 and are pivotally received within pivot receiving holes 118 formed in the panels 90, 92. The pivot shafts 116 are pivotable within the holes 118, allowing the collar 112 and the support rod 100 to pivot relative to the panels 90, 92.

A second collar 120 is connected to the rod 100 below the collar 112. The collar 120 includes a pair of ears 122 between which is secured the end of an actuating shaft 124. The opposite end 126 of the shaft 124 is rigidly secured to a pivotable shaft 128 the opposite ends of which are pivotally retained within pivot holes 130 formed in the panels 90, 92. A pair of links 132, 134 are fixed to the shaft 128 and to an actuator shaft 136. A pair of actuators 138, 140 are secured to the shaft 136, with each actuator being pivotally connected to the panels 90, 92.

As suggested by the description, the front landing gear 24 is retractable via actuation of the actuators 138, 140. The actuation force of the actuators 138, 140 is transmitted via the shaft 136, links 132, 134, shaft 128, shaft 124, and the collar 120 to the rod 100. Because the rod is pivotally mounted, the front landing gear 24 can be extended and retracted from the aircraft 10 as appropriate.

Because the front landing gear 24 is mounted on each side to the panels 90, 92, landing loads, including out-of-plane loads, are distributed into each of the panels 90, 92. The load is then distributed into the skins 26 which are bonded to the panels 90, 92. Because the load is distributed in this manner, the landing gear 24 is able to withstand greater landing loads, and the composite bulkhead panels are less likely to suffer failure, such as delamination, resulting from out-of-plane loads.

The front landing gear 24 is described as being retractable. However, the concepts described herein could also be applied where the landing gear 24 is designed to be fixed (i.e. non-retractable).

This bulkhead panel mounting of the front landing gear 24 also allows the mounting of the front landing gear to be disposed with a compartment 150 at the nose of the aircraft. The compartment 150 contains various sensitive electronics and avionics used by the aircraft. The compartment 150 provides an enclosure around the upper end of the landing gear 24 that is electromagnetic interference (EMI) shielded and environmentally shielded to prevent dust and other contaminants from entering the compartment and coming into contact with the electronics and avionics.

The embodiments disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. An aircraft landing gear mount, comprising:
   unmanned aerial vehicle having first and second bulkhead panels formed of composite material, the bulkhead panels extending vertically and the bulkhead panels are substantially planar and include facing side surfaces, upper edges and bottom edges;
   landing gear including a support rod and a wheel connected to an end of the support rod, the support rod including a mounting end that is disposed between the facing side surfaces, and between the upper edges and the bottom edges, of the first and second bulkhead panels;
   the mounting end of the support rod is mounted to the facing side surfaces of the first and second bulkhead panels;
   a metal support structure connected to the mounting end, the metal support structure including one side that is detachably mounted directly to the side surface of the first bulkhead panel and a second side that is detachably mounted directly to the side surface of the second bulkhead panel; and
   a third bulkhead panel extending between and generally perpendicular to the first and second bulkhead panels, the third bulkhead panel formed of composite material and including a side surface, and wherein the metal support structure is detachably mounted directly to the side surface of the third bulkhead panel.

2. The aircraft landing gear mount of claim 1, wherein the composite material is an anisotropic composite material.

3. The aircraft landing gear mount of claim 1, wherein the first, second and third bulkhead panels comprise wing bulkheads located in a wing of the aircraft.

4. The aircraft landing gear mount of claim 1, wherein the landing gear is fixed landing gear or retractable landing gear.

5. An aircraft comprising:
unmanned aerial vehicle with a plurality of bulkhead panels formed of composite material, the bulkhead panels extending vertically and each bulkhead panel includes side surfaces, top edges and bottom edges;
a plurality of landing gear, each landing gear including a support rod and a wheel connected to an end of the support rod, each support rod including a mounting end that is disposed between facing side surfaces, and between the top edges and the bottom edges, of two of the bulkhead panels;
the mounting end of each support rod is mounted to the facing side surfaces of two bulkhead panels; and
aircraft skins disposed over the bulkhead panels and fastened directly to the top and bottom edges of the bulkhead panels using a bonding material.

6. The aircraft of claim 5, wherein the composite material is an anisotropic composite material.

7. The aircraft of claim 5, wherein the bulkhead panels include wing bulkheads located in a wing of the unmanned aerial vehicle and nose bulkheads located in a nose of the unmanned aerial vehicle.

8. The aircraft of claim 5, wherein the landing gear is fixed landing gear or retractable landing gear.

9. The aircraft of claim 5, wherein the aircraft skins are formed of composite material.

10. The aircraft of claim 5, further comprising a metal support structure connected to each of the mounting ends, each metal support structure including one side that is detachably mounted directly to the facing side surface of one of the two bulkhead panels and a second side that is detachably mounted directly to the facing side surface of the other bulkhead panel.

11. The aircraft of claim 10, wherein the metal support structure of at least one landing gear is detachably mounted directly to the side surface of a third bulkhead panel that extends between and generally perpendicular to the two bulkhead panels.

12. The aircraft of claim 11, wherein the metal support structure of the at least one landing gear includes a lower mount section and an upper mount section disposed vertically above, and connected to, the lower mount section; and each of the lower mount section and the upper mount section include one side that is detachably mounted directly to the facing side surface of one of the two bulkhead panels, a second side that is detachably mounted directly to the facing side surface of the other bulkhead panel, and the lower mount section includes a third side that is detachably mounted directly to the side surface of the third bulkhead panel.

13. The aircraft of claim 5, wherein one of the landing gear is a front landing gear, the nose of the unmanned aerial vehicle includes a compartment, and the mounting end associated with the front landing gear is located in the compartment, and further comprising unmanned aerial vehicle electronics disposed within the compartment.

14. The aircraft of claim 13, wherein the compartment is electromagnetic shielded and environmentally shielded.

15. The aircraft landing gear mount of claim 1, wherein the metal support structure includes a lower mount section and an upper mount section disposed vertically above, and connected to, the lower mount section, and the lower mount section and the upper mount section each include one side that is detachably mounted directly to the side surface of the first bulkhead panel, the lower mount section and the upper mount section each include a second side that is detachably mounted directly to the side surface of the second bulkhead panel, and the lower mount section includes a third side that is detachably mounted directly to the side surface of the third bulkhead panel.

* * * * *